April 10, 1956 C. V. KEHRES ET AL 2,741,401
FEEDER CONSTRUCTION
Filed Jan. 23, 1952 2 Sheets-Sheet 1
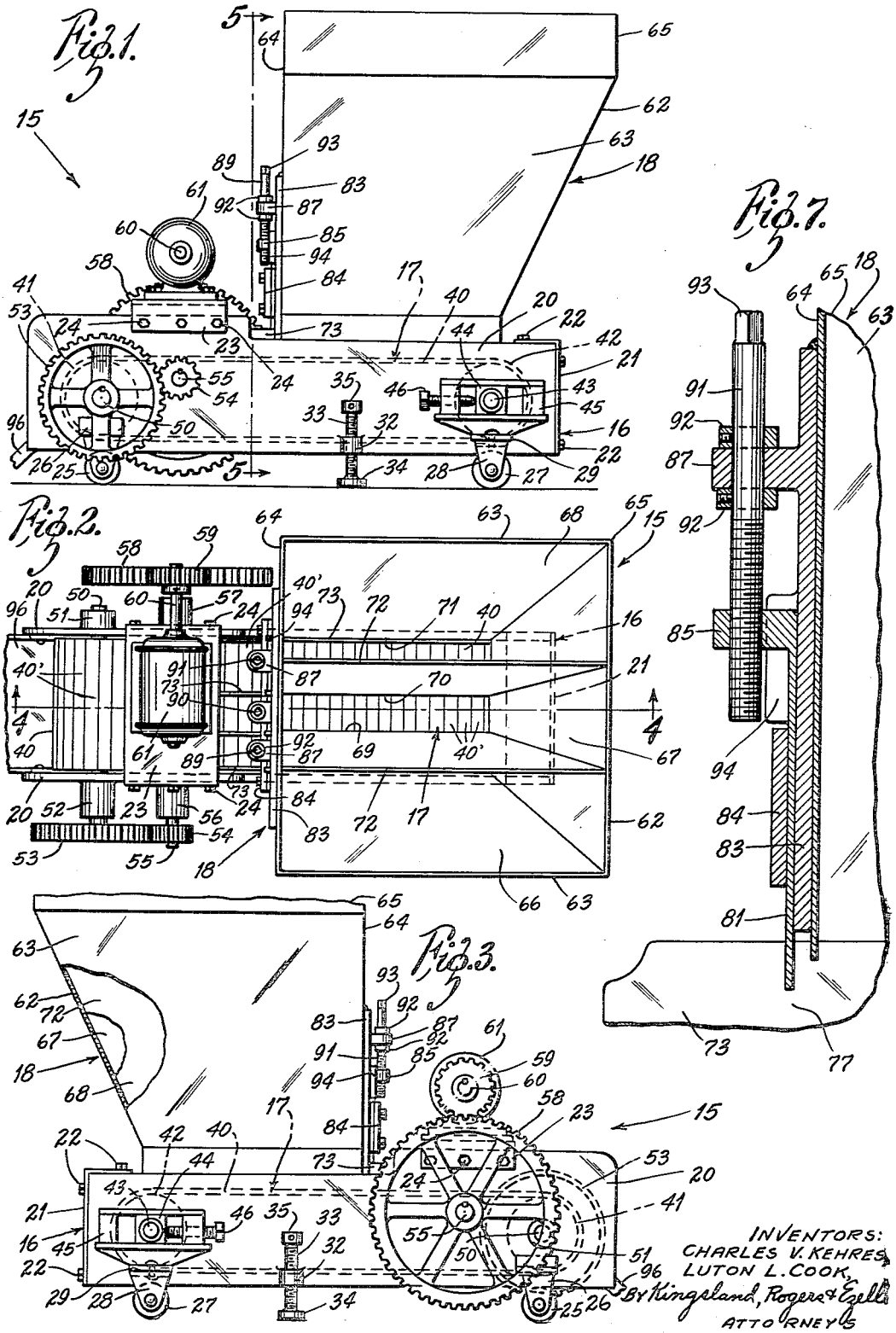
INVENTORS:
CHARLES V. KEHRES,
LUTON L. COOK,
By Kingsland, Rogers & Ezell
ATTORNEYS

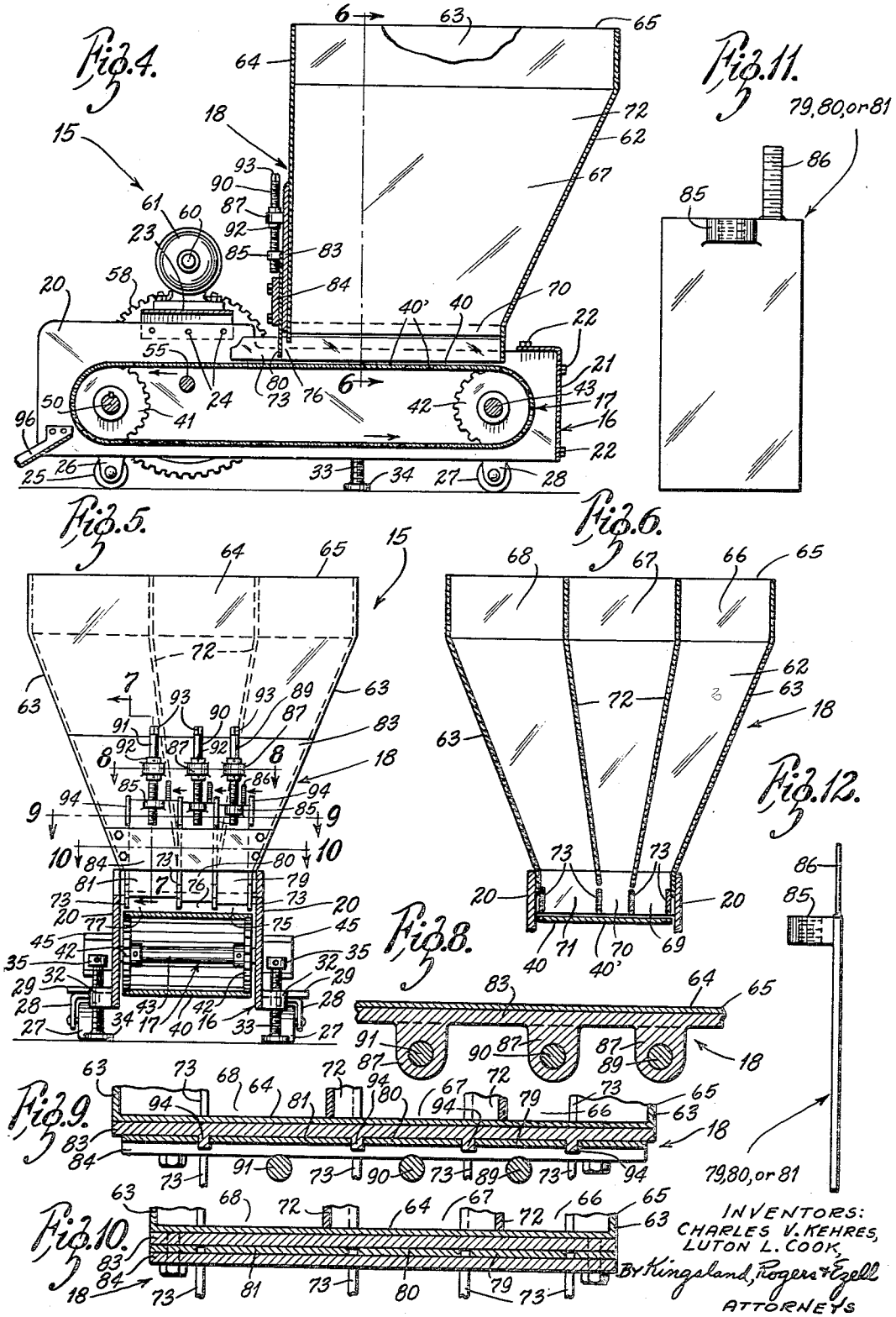

United States Patent Office 2,741,401
Patented Apr. 10, 1956

2,741,401

FEEDER CONSTRUCTION

Charles V. Kehres, Webster Groves, and Luton L. Cook, St. Louis, Mo., assignors to Laclede-Christy Company, St. Louis, Mo., a corporation of Missouri Application January 23, 1952, Serial No. 267,724

2 Claims. (Cl. 222—136)

The present invention relates generally to feeder constructions, and more particularly to a feeder apparatus capable of continuously metering and delivering selectively predeterminable quantities of a plurality of materials, such as the several materials required in the formation of firebrick, and the like.

In the clay products industry, there has long existed the need for an apparatus which will feed materials continuously into grinding machinery in uniform proportions and amount ins order to provide a uniform product. Hand labor has been used for centuries to supply selected clay product materials to the grinding machinery, but it is manifest that the human element cannot be relied upon to achieve the desired uniformity where the materials are fed in, in effect, in an intermittent stream. Batch loading of the several selected materials into the grinding machinery is undesirable, since peak and low drains are made, both upon the power which drives the machinery and upon the grinding elements of the mixer. Later years have also introduced the serious problem of economy from the hand labor standpoint, since the wages of unskilled labor have continued to increase.

The present novel feeder apparatus is a solution to the long standing problem, and, in brief, comprises a multi-compartment hopper mounted over and feeding onto a continuous conveyer which extends beyond the hopper and may be disposed to discharge directly, or by way of a chute, into grinding machinery. Adjustable gates are provided for metering the several materials moved from the hopper on the conveyer. The present feeder apparatus may be a mobile unit, as shown, or it may be provided with a stationary mount.

Therefore, an object of the present invention is to provide a feeder apparatus which will deliver uniform predetermined amounts of materials to a mixing point at a constant rate.

Another object is to provide a novel feeder apparatus which includes adjustable metering gates which are individually adjustable in order to deliver selective amounts of each material to the mixing point.

Another object is to provide a feeder apparatus for handling a plurality of materials which will continuously feed in a constant stream predetermined quantities of selected material to a mixing point, such as into grinding machinery in the clay products art, thereby achieving uniformity of the ultimate product, improving the power factor, equalizing the wear of the grinding machinery, and insuring a greatly increased output of the ultimate product per working day.

Another object is to provide a feeder apparatus particularly adapted to the clay products art, which is of sturdy construction, which is of relatively few moving parts, which requires very little maintenance, which is adapted to function with a minimum down time, and which requires the attention of less than half the number of men formerly required to produce substantially the same amount of the finished product.

The foregoing and other objects and advantages are apparent from the following description taken with the accompanying drawings, in which:

Fig. 1 is a side elevational view of a feeder apparatus constructed in accordance with the teachings of the present invention, the materials delivery chute being broken away for conservation of space;

Fig. 2 is a top plan view thereof, the materials delivery chute being broken away for conservation of space;

Fig. 3 is a side elevational view thereof, viewed from the side opposite to that shown in Fig. 1, a portion of the top of the hopper being broken away for conservation of space, and a portion of the side thereof being broken away to illustrate details of construction;

Fig. 4 is a vertical longitudinal cross-sectional view taken on substantially the line 4—4 of Fig. 2;

Fig. 5 is a vertical transverse cross-sectional view taken on substantially the line 5—5 of Fig. 1;

Fig. 6 is a vertical transverse cross-sectional view taken on substantially the line 6—6 of Fig. 4;

Fig. 7 is an enlarged vertical longitudinal cross-sectional view taken on substantially the line 7—7 of Fig. 5;

Figs. 8, 9 and 10 are enlarged horizontal cross-sectional views taken on substantially the lines 8—8, 9—9, and 10—10 of Fig. 5;

Fig. 11 is an enlarged front elevational view of one of the metering gates; and

Fig. 12 is a side elevational view thereof.

Referring to the drawings more particularly by reference numerals, 15 indicates generally a feeder apparatus incorporating the concepts of the present invention. Broadly, the feeder apparatus 15 includes a base construction 16, a power driven endless conveyer construction 17, and a gated hopper construction 18.

More particularly considering the several components of the feeder apparatus 15, the base construction 16 includes two spaced parallel side plates 20 of substantial thickness, and of a configuration clearly shown in the drawings. A rear end plate 21 is secured by bolts 22 to the rear ends of the plates 20 to brace the same. A U-shaped plate 23 spans the top edges of the plates 20 towards the forward ends thereof and is secured thereto by suitable bolts 24. Front rollers 25 are rotatably supported by brackets 26 which are welded to the outer faces of the plates 20. Rear rollers 27 are rotatably mounted on brackets 28 which are pivotally connected to small plates 29 welded or otherwise secured to the outer faces of the side plates 20. Hence, the rear rollers 27 are casters which facilitate movement of the feeder apparatus 15 in any desired direction. A vertically threaded boss 32 is welded to the outer face of each plate 20 near the center thereof which receives a threaded shaft 33 having a foot 34. An apertured head 35 is secured to the upper end of each shaft 33 which is adapted to receive a tool in a selected opening for ready rotation of the shaft 33 and adjustment of the position of the foot 34. The feet 34 are employed to maintain the feeder apparatus 15 in a selected feeding position, it being understood that the feet 34 are lowered into substantial contact with the supporting floor to relieve a predetermined portion of the load from the rear caster rollers 27 when the feeder apparatus 15 is in feeding position.

The power driven conveyer construction 17 includes a conventional endless conveyer belt 40 of articulated metal slats 40' connected by links at the ends, or otherwise, and individually indented underneath to receive the teeth of opposed driven sprockets 41 and opposed idler sprockets 42. The idler sprockets 42 are freely mounted on a shaft 43 which extends through an elongated opening in each of the side plates 20 and is supported in slide blocks 44 slidably mounted in brackets 45 welded or otherwise secured to the outer faces of the plates 20. An adjustment screw 46 is provided for determining the position of each of the slide blocks 44, as is clear from the drawings. The driven sprockets 41 are secured by suitable setscrews and keys to a driven shaft 50 having bearing support in bearings 51 and 52 welded or otherwise secured to the side plates 20 (Fig. 2). A large gear 53 is secured by a setscrew and key to the shaft 50 beyond the bearing 52 which meshes with a much smaller gear 54 secured by a setscrew and key to a shaft 55 having bearing support in bearings 56 and 57 welded or otherwise secured to the side plates 20. A large gear 58 is secured by a setscrew or the like to the shaft 55 adjacent the bearing 57 which meshes with a smaller gear 59 secured by a setscrew and key to the driven shaft 60 of a constant speed electric motor 61 which is secured by suitable bolts to the plate 23.

The gated hopper construction 18 removably rests on and snugly fits against the inner surfaces of the side plates 20, as is clear from the drawings, and comprises a hopper 65 defined exteriorly by a rear wall 62, side walls 63, and a front wall 64, which is illustrated as having three compartments 66, 67, and 68 defined by said four walls and interior partitions 72, although a greater or a lesser number of compartments may be employed. The compartments 66, 67, and 68 are open at the top as illustrated in order to be readily charged by a loading tractor, a small crane, or other desired means. The compartments 66, 67, and 68 have bottom openings 69, 70, and 71 which discharge directly onto the conveyer belt 40, as is clear from the drawings, particularly Figs. 2 and 6. It is also to be noted from Fig. 4 and Fig. 6 that the lower edges of the dividing walls 72 and side walls 63 of the hopper 65 terminate substantially short of the belt 40 and are supplemented by vertical divider plates 73 which are welded or otherwise secured at their rear edges to the rear wall 62 and near the front are welded or otherwise secured to the lower edge of the front wall 64. The vertical divider plates 73 extend forwardly beyond the hopper 65 to assist discharge on the belt of the proper amount of materials from each compartment 66, 67, and 68. The divider plates 73 extend sufficiently close to the conveyer belt 40 to prevent intermingling of materials being discharged thereon.

The front wall 64 of the hopper 65 also terminates at substantially the top elevation of the divider strips 73 and cooperates with the divider strips 73 and the belt 40 to define openings 75, 76, and 77 through which material may pass in the rotation of the belt 40, which are closed by vertically adjustable gates 79, 80, and 81 in the lower extreme position of movement of each (Fig. 5). The gates 79, 80, and 81 are reciprocatable between plates 83 and 84, the former of which is welded or otherwise secured to the front wall 64 of the hopper 65 and the latter of which is bolted to the former. Each of the three gates 79, 80, and 81 includes an integral vertically threaded boss 85 and a vertical scale 86 which is welded to the top edge thereof, as is particularly shown in Figs. 11 and 12. Three spaced vertically bored bosses 87 and welded to or formed integral with the plate 83 are disposed in positions above and in alignment with the bosses 85 of the gates. Threaded shafts 89, 90, and 91 are supported by suitable collars 92 from the bosses 87 and threadedly engage the bosses 85 (Figs. 5 and 7). Each shaft 89, 90, and 91 includes a squared upper end 93 which is adapted to receive a wrench or other tool for turning the selected shaft 89, 90, or 91 to effect vertical movement of the supported gates 79, 80, and 81, respectively. Guide elements 94 welded to the plate 83 assist in maintaining the gates 79, 80, and 81 in the proper paths of movement. In Fig. 5, the gates 79, 80, and 81 are shown at different elevations.

A chute 96 is provided at the forward end of the feeder apparatus 15, being bolted to the inner faces of the side plates 20 in position to receive materials from the conveyer 40 for discharge into grinding machinery, or the like.

Operation

In the use of the present feeder apparatus 15, selected clay product materials, or the like, are deposited by tractor shovel, or the like, in the selected compartments 66, 67, and 68 of the hopper 65. Since each of these compartments is open at the bottom, a certain amount of each material will be immediately deposited upon the conveyer belt 40. The gates 79, 80, and 81 are individually adjusted to the desired metering positions. Thereafterwards, upon energization of the motor 61 by a suitable switch (not shown), the conveyer belt 40 will move in the direction of the arrows in Fig. 4 and will move materials from the compartments 66, 67, and 68, and discharge the same onto the chute 96 for gravity drop into grinding machinery, or the like. All other factors being the same as with manual hand feeding of grinding machinery, the feeder apparatus 15 increases the output from thirty to fifty percent.

It is manifest that uniform amounts of the materials will be moved by the conveyer belt 40 from the compartments 66, 67, and 68, the particular amount in each instance being determined by the position of the respective gates 79, 80, or 81. Hence, the end products, such as firebrick, or the like, will be of uniform construction. When the feeder apparatus 15 is used with grinding machinery, there will be less wear and tear on the grinding elements and the power factor will be improved, since the grinding elements will not have to overcome batch loads and the constant supply of materials will eliminate peaks and lows in current drainage. Also, there will be no stoppage of the material, but it will be continuously fed so that maximum output obtains.

The gated hopper construction 18 is readily removable to permit interchange of hopper constructions different in respect to the compartments, etc. Removable bolts may be used to insure the hopper constructions 18 remaining in place, if desired, but same have not been found necessary.

It is apparent that there has been provided a novel feeder construction which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, feeder apparatus comprising a support, a compartmentized hopper on said support including compartments having discharge outlets at the bottom thereof, a conveyer construction on said support including a single conveyer belt having a portion thereof extending beneath the said hopper discharge outlets to receive discharged materials therefrom, said hopper discharge outlets being in parallel relation in respect to the direction of movement of said conveyer belt and extending transversely across said conveyer belt, means for actuating said conveyer, a separate adjustable gate at the end of each hopper compartment for individually determining the amount of material to be moved by the conveyer belt from each compartment, each gate being mounted for vertical movement and being suspended on a vertical threaded shaft by means of a threaded rider member secured to the gate, and parallel divider members extending along said single conveyer belt from the gates to insure the discharge of the predetermined amount of material from each compartment.

2. In combination, feeder apparatus comprising a support, a compartmentized hopper on said support having discharge outlets at the bottom thereof, said hopper including at least three parallel compartments each of which has one of said discharge outlets at the bottom, a conveyer construction on said support including a single conveyer belt having a portion thereof extending beneath the said hopper discharge outlets to receive discharged materials therefrom, said parallel compartments being parallel with the direction of movement of the conveyer belt, means for actuating said conveyer, a separate gate at the end of each hopper compartment for individually determining the amount of material to be moved by the conveyer belt from each compartment, each gate being mounted for vertical movement and being adjustably retained on a vertical threaded shaft, and parallel divider members disposed immediately above the conveyer belt and extending through the hopper and forwardly from the gates so as to divide the belt into a plurality of side by side longitudinally extending materials transporting areas for insuring the discharge of the predetermined amount of material from each compartment.

References Cited in the file of this patent

UNITED STATES PATENTS

| | | |
|---|---|---|
| 528,230 | Kaucher | Oct. 30, 1894 |
| 845,168 | Fisher | Feb. 26, 1907 |
| 900,227 | Svenson | Oct. 6, 1908 |
| 990,395 | Searle | Apr. 25, 1911 |
| 1,070,798 | Green et al. | Aug. 19, 1913 |
| 1,170,804 | Dunham | Feb. 8, 1916 |
| 1,312,314 | Eisenmann et al. | Aug. 5, 1919 |
| 1,409,003 | James | Mar. 7, 1922 |
| 1,529,219 | Schaab | Mar. 10, 1925 |
| 2,373,239 | Fenn | Apr. 10, 1945 |